US008256697B2

(12) United States Patent
Amburgey

(10) Patent No.: US 8,256,697 B2
(45) Date of Patent: Sep. 4, 2012

(54) SEAL ASSEMBLY WITH SHROUD

(75) Inventor: Michael Duane Amburgey, London, OH (US)

(73) Assignee: Moyno, Inc., Springfield, OH (US)

( * ) Notice: Subject to any disclaimer, the term of this patent is extended or adjusted under 35 U.S.C. 154(b) by 271 days.

(21) Appl. No.: 12/783,623

(22) Filed: May 20, 2010

(65) Prior Publication Data

US 2011/0284675 A1 Nov. 24, 2011

(51) Int. Cl.
*B02C 23/36* (2006.01)

(52) U.S. Cl. .................. 241/46.06; 241/101.2; 241/236; 277/367; 277/393

(58) Field of Classification Search .................. 277/367, 277/370, 371, 390, 391, 393; 241/236, 46.06, 241/101.2
See application file for complete search history.

(56) References Cited

U.S. PATENT DOCUMENTS

| | | | |
|---|---|---|---|
| 2,985,472 A | 5/1961 | Schoenrock | |
| 3,101,200 A | 8/1963 | Tracy | |
| 3,554,559 A * | 1/1971 | Dahlheimer | 277/348 |
| 4,253,713 A | 3/1981 | Chambers, Sr. | |
| 4,482,194 A | 11/1984 | Chambers, Sr. | |
| 4,625,977 A * | 12/1986 | Azibert et al. | 277/361 |
| 4,707,150 A | 11/1987 | Graham | |
| 4,840,384 A | 6/1989 | Dorsch | |
| 5,048,764 A | 9/1991 | Flament | |
| 5,451,065 A * | 9/1995 | Holder | 277/390 |
| 5,478,020 A | 12/1995 | Chambers, Sr. et al. | |
| 5,551,708 A * | 9/1996 | Vesey et al. | 277/390 |
| 6,267,382 B1 | 7/2001 | Auber | |
| 2005/0242515 A1 * | 11/2005 | Brooks et al. | 277/370 |

* cited by examiner

*Primary Examiner* — Mark Rosenbaum
(74) *Attorney, Agent, or Firm* — Thompson Hine L.L.P.

(57) ABSTRACT

A seal system including a sleeve configured to receive a rotatable shaft therein and a dynamic race configured to be rotatably coupled to the shaft. The seal system further includes a biasing element configured to urge the dynamic race into engagement with a static race to form a primary seal, and a shroud configured to be rotatably coupled to the sleeve and positioned radially outside the biasing element. The seal system also includes a sealing element configured to be positioned radially inside the biasing element and to sealingly engage the sleeve to provide a secondary seal to generally block fluid bypassing the primary seal.

18 Claims, 7 Drawing Sheets

SEAL ASSEMBLY WITH SHROUD

The present invention is directed to a seal assembly for use with a rotatable component, and, more particularly, to a seal assembly including a shroud.

BACKGROUND

Seal assemblies are often utilized to journal the ends of a rotating shaft in a sealed manner. Such seal assemblies may be used in fluids processing technologies, such as wastewater treatment, food processing, materials handling and the like in which a rotatable shaft is utilized to carry cutters, spacers, baffles, diverters, agitators, mixers, pumping elements, etc. In many applications, it is desired to isolate the material being processed. However, the material being processed can be under high pressure and can be trapped in or otherwise interfere with proper operation and sealing of the seal assemblies.

SUMMARY

In one embodiment the present invention is an improved, robust seal assembly. More particularly, in one embodiment the present invention is a seal system including a sleeve configured to receive a rotatable shaft therein and a dynamic race configured to be rotatably coupled to the shaft. The seal system further includes a biasing element configured to urge the dynamic race into engagement with a static race to form a primary seal, and a shroud configured to be rotatably coupled to the sleeve and positioned radially outside the biasing element. The seal system also includes a sealing element configured to be positioned radially inside the biasing element and to sealingly engage the sleeve to provide a secondary seal to generally block fluid bypassing the primary seal.

DETAILED DESCRIPTION

Figure 1:
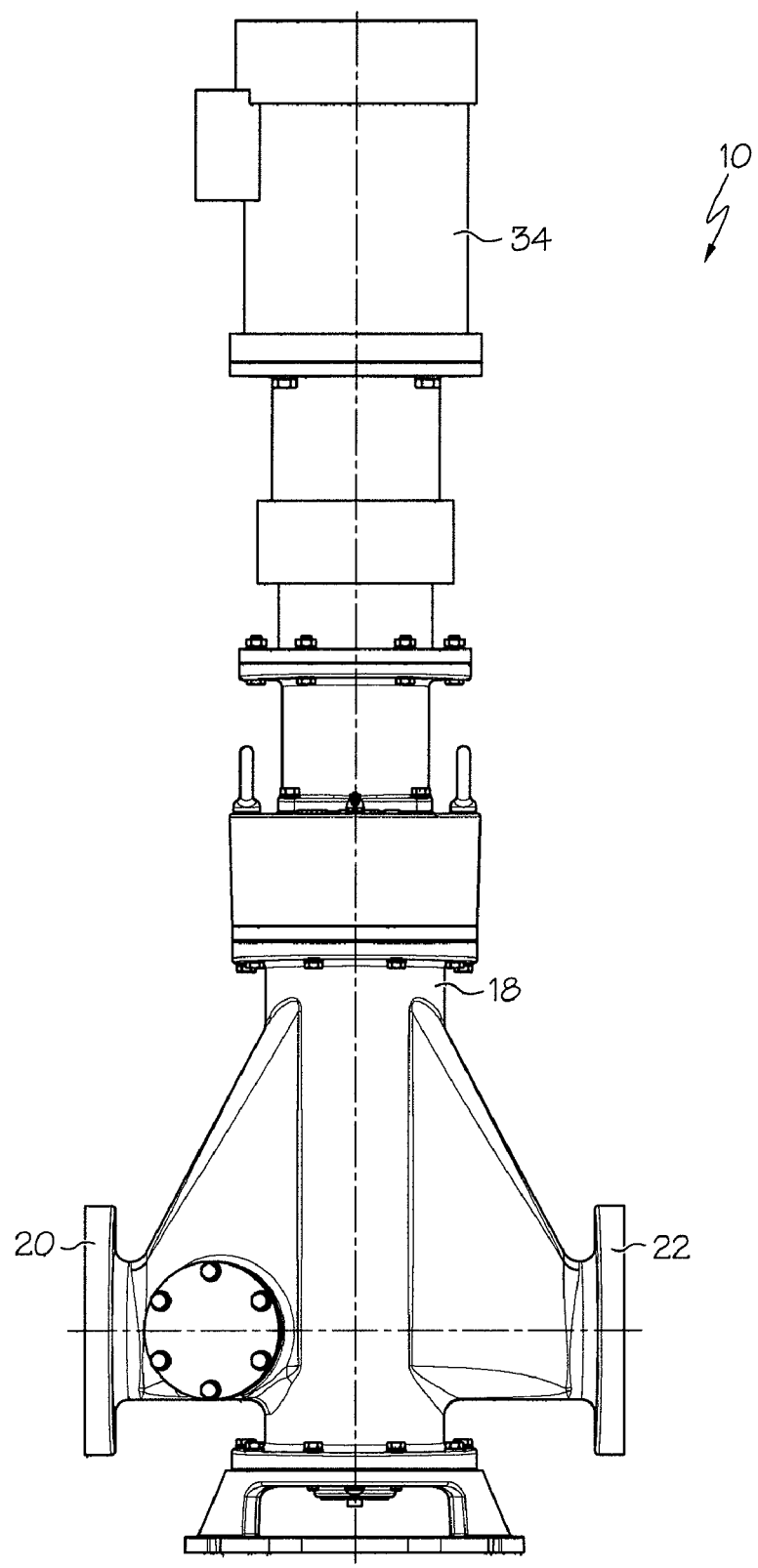
FIG. 1 is a front view of a grinder assembly in which the seal assembly may be utilized.
Figure 2:
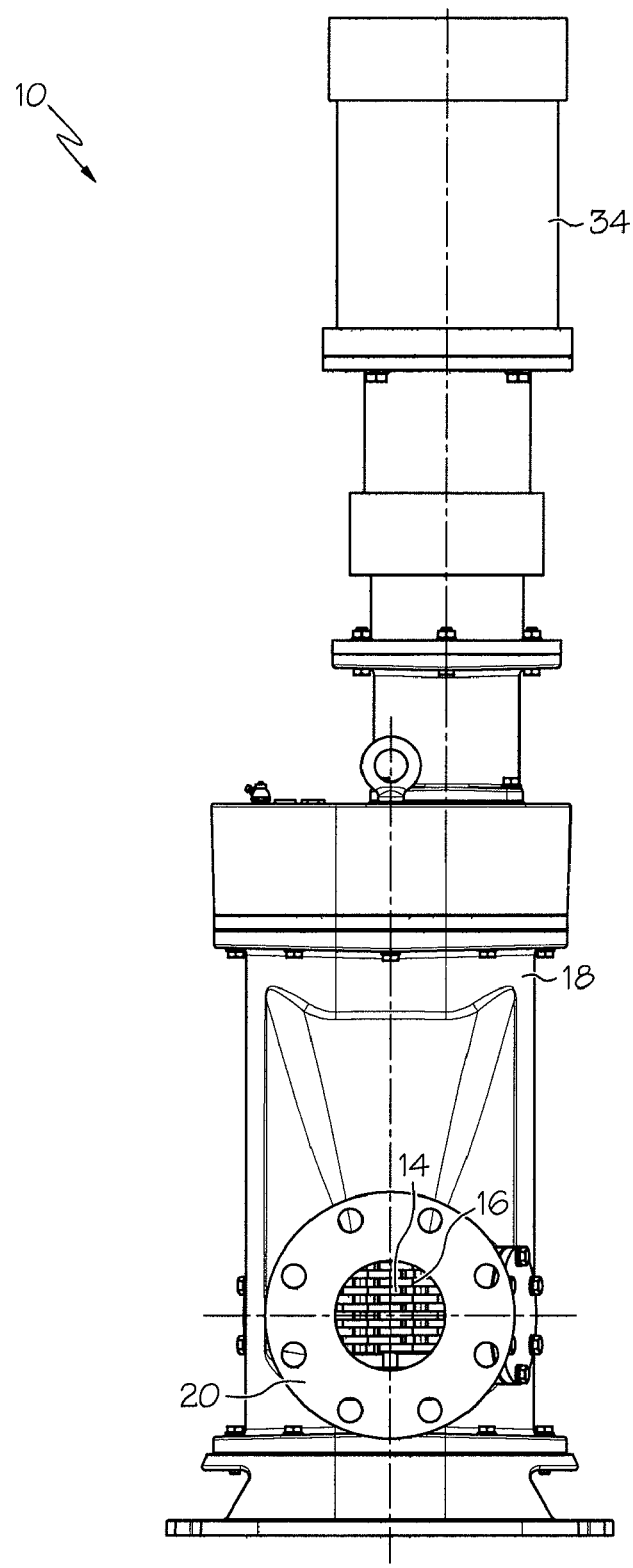
FIG. 2 is a side view of the grinder assembly of FIG. 1.
Figure 3:
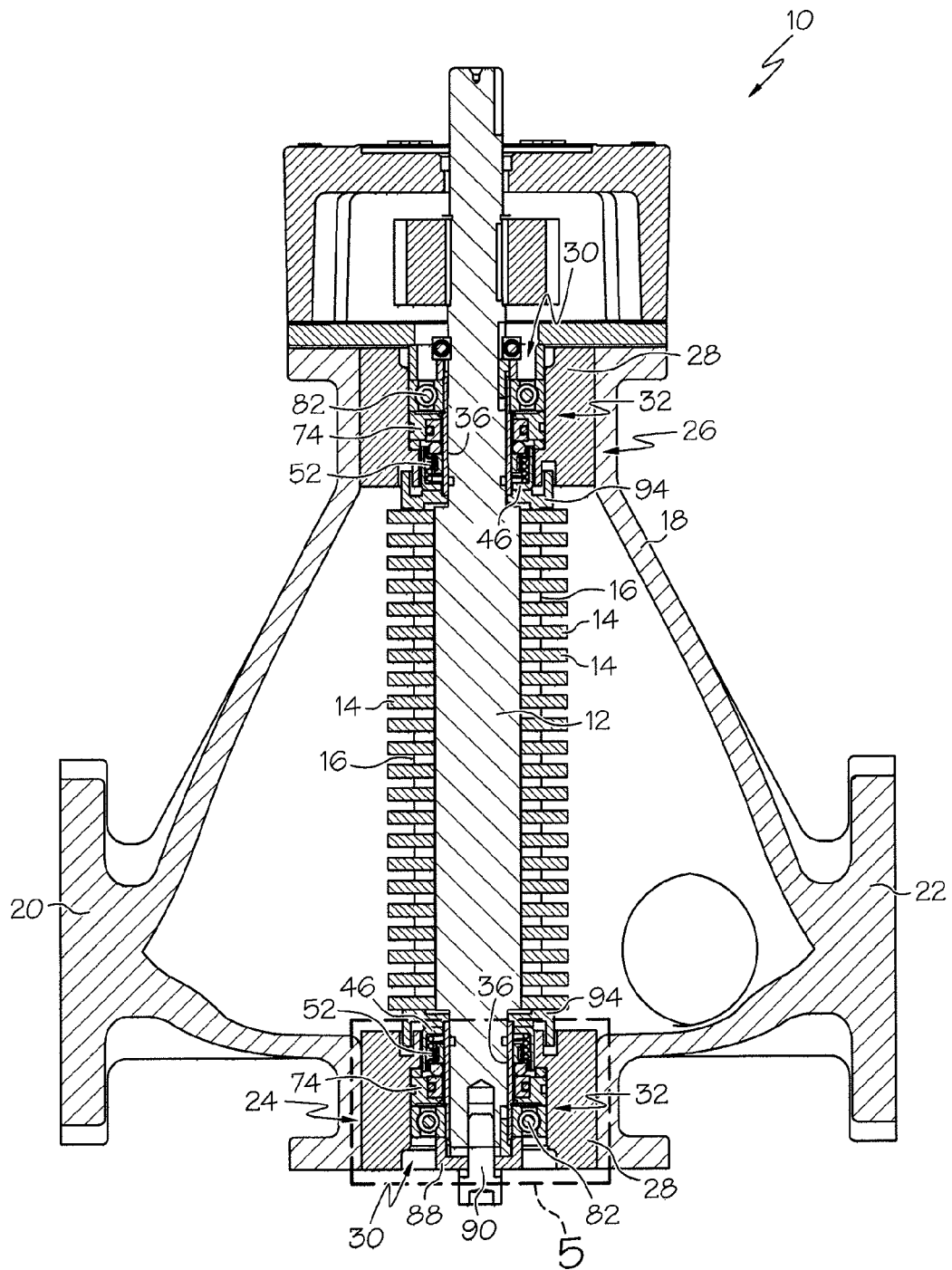
FIG. 3 is a side cross section of the lower part of the grinder assembly of FIG. 1.

FIGS. 1-4 illustrate a grinder assembly/comminutor 10 in which a seal assembly disclosed herein may be utilized. However, it should be understood that the seal assembly can be used in any of a wide variety of systems or components in which it is desired to seal and/or journal a rotating shaft, such as such as wastewater treatment systems, food processing equipment, materials handling systems and the like which can carry any of a variety of elements (if any) on the shafts such as cutters, spacers, baffles, diverters, agitators, mixing elements, screens, augers, pumping elements or the like. For example, besides being used in a grinder assembly the seal assembly can be used to journal a shaft carrying a cylindrical screen which is configured to screen or divert solids suspended in a liquid stream; to journal a shaft of a progressing cavity pump; to journal a shaft of an auger, etc.

The grinder assembly 10 shown in FIGS. 1-4 includes a pair of parallel rotatable shafts 12 (shown as shafts 12a, 12b in FIG. 4), each shaft 12 carrying a plurality of generally disc-shaped cutter teeth 14 thereon. The teeth 14 of one shaft 12 are spaced and sized to intermesh with the teeth 14 of the other shaft 12 such that, during rotation of the shafts 12, the teeth 14 create shearing forces to grind, shear, comminute or macerate solids suspended in a fluid flow. A series of spacers 16 may be located on each shaft 12 such that a 16 spacer is positioned between adjacent teeth 14 on each shaft 12 to maintain alignment of the teeth 14 and potentially to aid in processing of the suspended solids.

The grinder assembly 10 includes a motor 34 (FIGS. 1 and 2) which drives the drive shaft 12a (FIG. 4) which carries a drive gear 31 thereon. The drive gear 31 meshes with a driven gear 33 of the driven shaft 12b such that rotation of the drive shaft 12a causes corresponding counter-rotation of the driven shaft 12b. In the illustrated embodiment, the drive shaft 12a and driven shaft 12b are driven in opposite directions (i.e., in counter-rotation) towards each other relative to the upstream side of the grinder assembly 10. However, the shafts 12a, 12b can be geared to be driven in the same direction (i.e., at differing speeds) or counter-rotated away from each other (relative to the upstream side), if desired.

Figure 4:
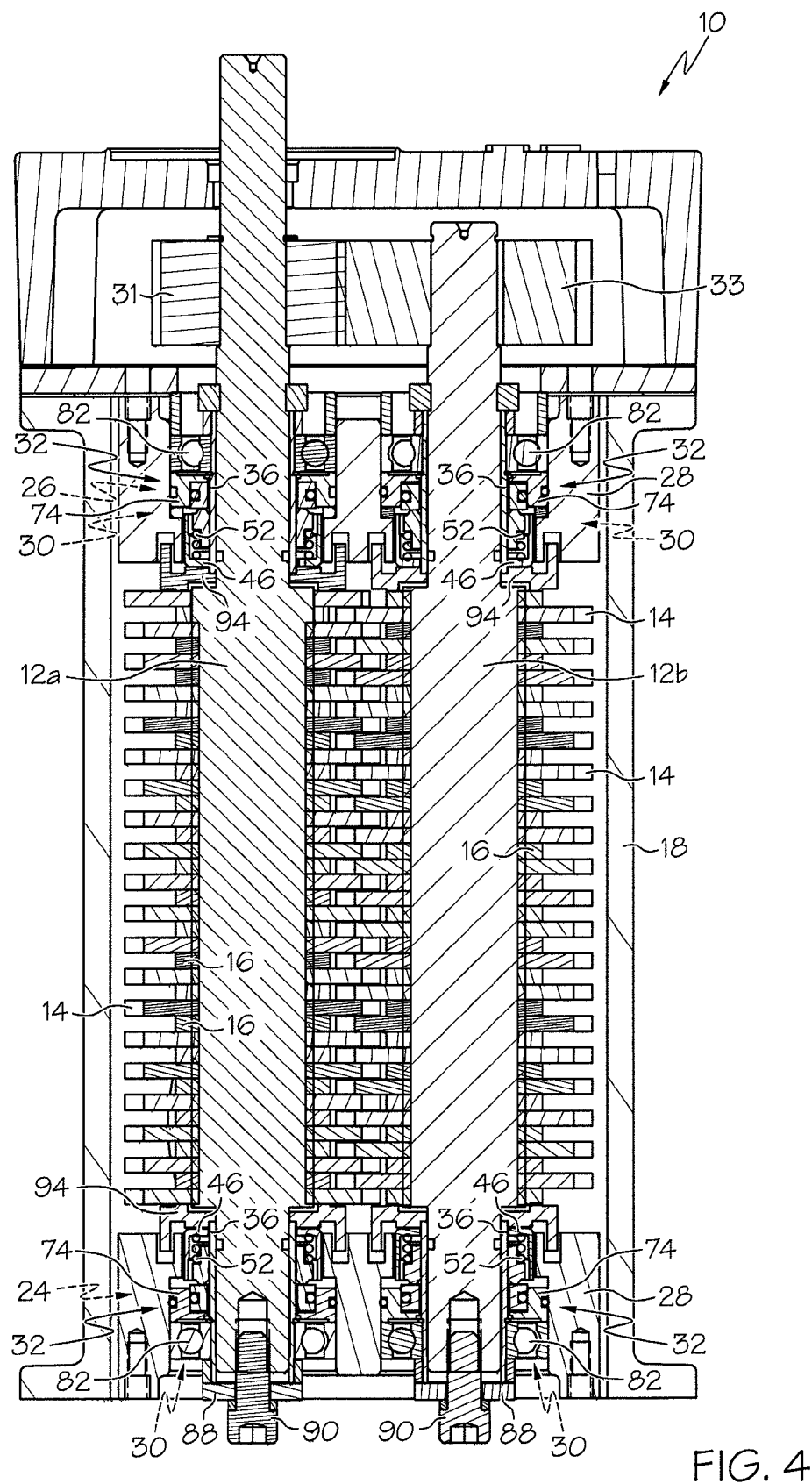
FIG. 4 is a front cross section of the lower part of the grinder assembly of FIG. 1.

As best shown in FIG. 1, the grinder assembly 10 includes a frame 18 having an inlet port 20 and an outlet port 22 through which fluid carrying the suspended solids (such as wastewater) flows. The frame 18 defines base openings 24 and top opening 26 (FIGS. 3 and 4), each of which receives an end casing 28 therein. Each end casing 28 has a pair of bores 30, each of which receives a seal assembly 32 therein in a sealed manner. Each shaft 12 is journaled in a seal assembly 32 at each end thereof, resulting in a total of four seal assemblies 32 for the illustrated grinder assembly 10, as shown in FIG. 4. However, in certain cases and for certain devices, only selected ones of the shafts 12, or only a selected end of a shaft 12, may be journaled in a seal assembly 32.

Figure 5:
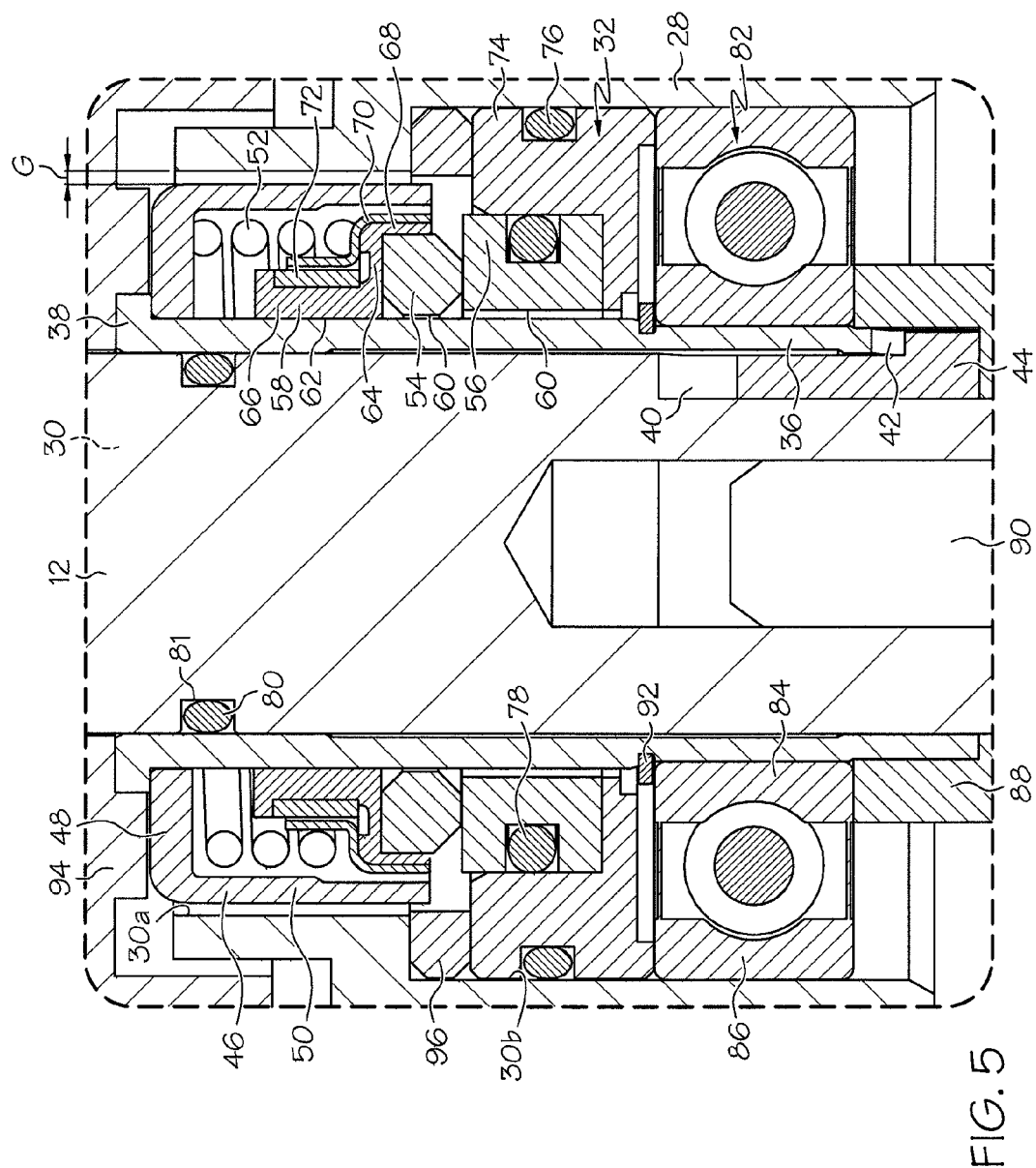
FIG. 5 is a detail view of area indicated in FIG. 3.
Figure 6:
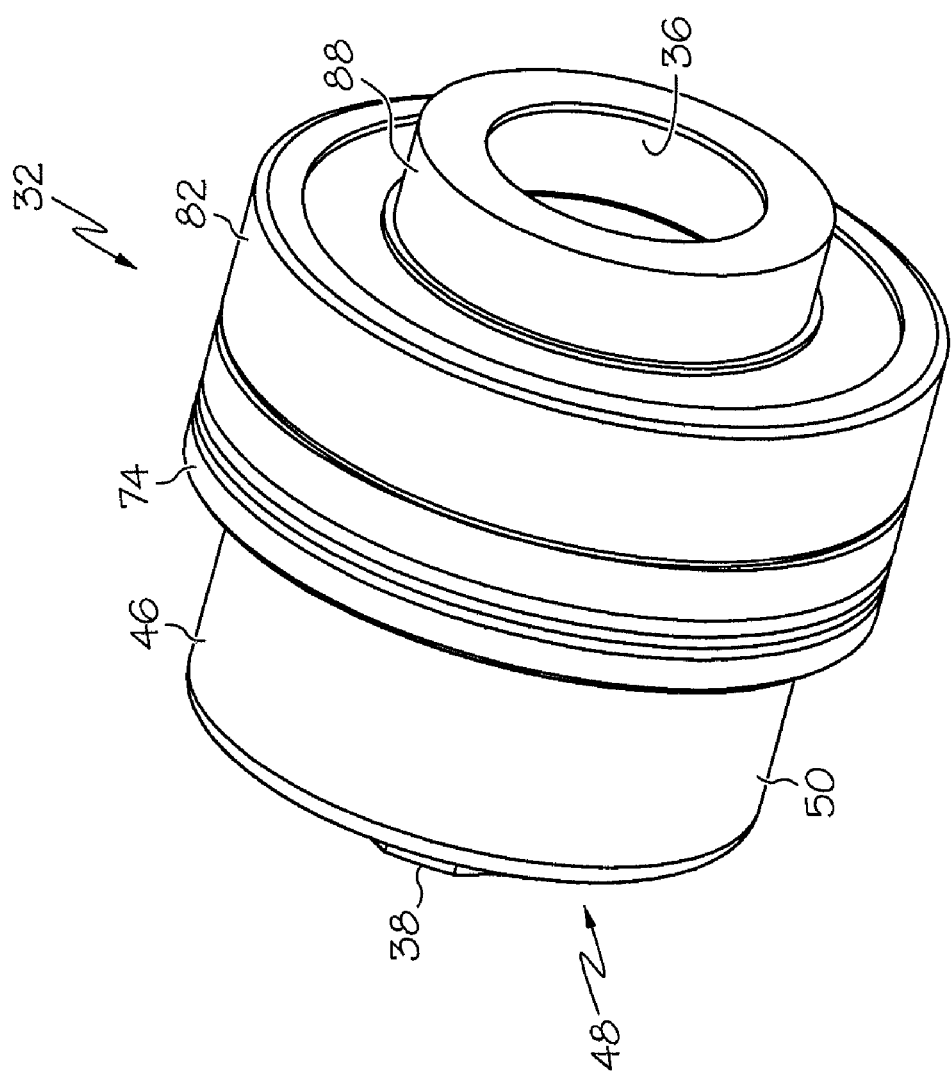
FIG. 6 is a perspective view of the seal assembly shown in FIG. 5.
Figure 7:
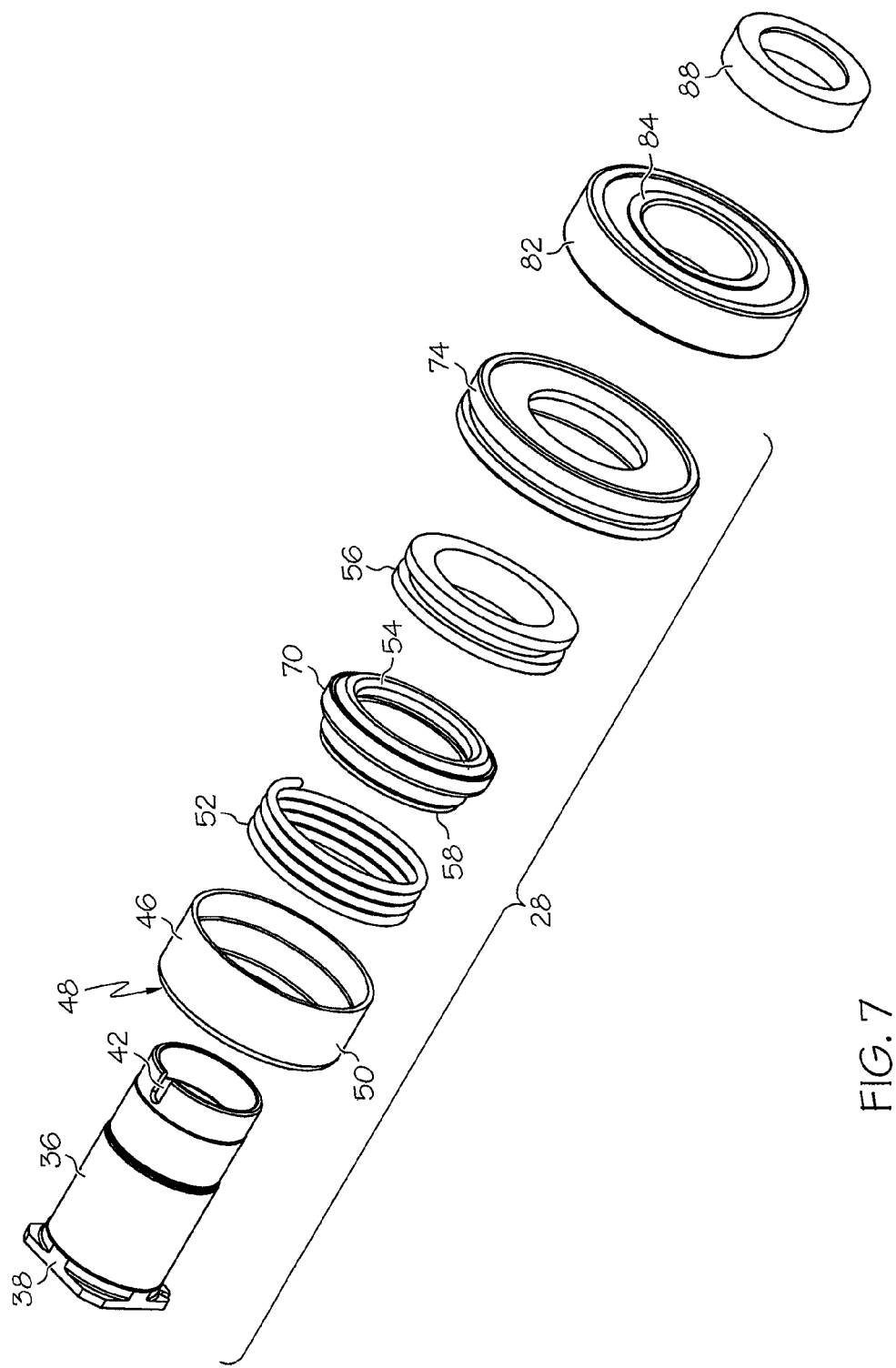
FIG. 7 is an exploded view of the seal assembly of FIG. 6.

As best shown in FIGS. 5-7, each seal assembly 32 includes a generally cylindrical sleeve 36 which receives the distal end of the rotating shaft 12 therein. The sleeve may include a lip 38 at an axial end thereof, although in some cases the sleeve 36 may lack the lip 38. The sleeve 36 may be rotationally coupled to the associated shaft 12 due to a frictional fit or by mechanical couplings or the like. For example, in the illustrated embodiment the shaft 12 includes an axially-extending keyway 40 (FIG. 5) that is aligned with an axially-extending slot 42 of the sleeve 36 (see FIG. 7). A key 44 (FIG. 5) is received in the keyway 40 and the slot 42 to rotationally couple the shaft 12 to the sleeve 36.

The seal assembly 32 includes a shroud 46 positioned at or adjacent to end of the sleeve 36 and coaxial with the sleeve 36. In the illustrated embodiment the shroud 46 is a separate piece from the sleeve 36, although the sleeve 36 and shroud 46 may be a unitary, one-piece item if desired. The shroud 46 may be positioned adjacent to the lip 38 such that the lip 38 can help to maintain the desired axial positioning of the shroud 46. The shroud 46 may be rotationally coupled to the sleeve 36 by a shrink/interference fit or by various mechanical coupling arrangements. The shroud 46 includes a generally radially-extending portion 48 engaging the sleeve 36 and a generally axially-extending portion 50 extending away from the lip 38/generally radially-extending portion 48. If desired, the sleeve 36 may include an area of increased thickness/stiffness where the shroud 46 engages the sleeve 36 (i.e. below the lip 38), to ensure the sleeve 36 retains its shape due to any forces applied thereto, such as forces applied by the shroud 46 in the case of an interference fit.

A biasing element 52, such as a spring, is positioned adjacent to, and radially inwardly of, the shroud 46 and captured therein. The biasing element 52 is placed in compression when the seal assembly 32 is assembled and operatively engages a generally annular dynamic race 54 and urges the dynamic race 54 into contact with a generally annular static race 56. In this manner, the rotatable dynamic race 54 is urged into contact with the generally non-rotating static race 56 to form a primary seal of the seal assembly 32 at the facial contact between the races 54, 56.

A sealing element 58 is positioned radially inwardly of the biasing element 52 and engages the sleeve 36 such that a radial plane extends through both the sealing element 58 and the biasing element 52. The sealing element 58 is also configured and positioned such that at least part of the sealing element 58 is positioned axially between the biasing element 52 and the dynamic race 54. In this manner, the sealing element 58 help to prevent the flow of fluid (including wastewater and/or surrounding environmental fluids such as air) which might otherwise pass though a radial gap 60 between the sleeve 36 and the static 56 and/or dynamic race 54, thereby forming a secondary seal of the seal assembly 32 along edge 62. The secondary seal 62 generally blocks the flow of any fluid bypassing or attempting to bypass the primary seal. The sealing element 58 is arranged such that higher pressure fluids (i.e., on the radially outer surface thereof) press the sealing element 58 tighter against the sleeve 36. Thus, higher pressures actually increase the sealing at the secondary seal 62.

In the illustrated embodiment, the sealing element 58 takes the form of a bellows including a middle, generally radially-extending portion 64, and first 66 and second 68 generally axially-extending portions positioned on opposite sides of the middle portion 64. The first portion 66 engages, and forms a seal 62 with, the sleeve 36. The middle 64 and second 68 portions wrap around the dynamic race 54 and are positioned adjacent to, and engage, the axially inner surface and radially outer surface of the dynamic race 54, respectively. However, the sealing element 58 can take any of a wide variety of shapes and configurations beyond the bellows shown in FIG. 5, such as a simple gasket or washer which sealingly engages the sleeve 36

In the illustrated embodiment, the sealing element 58 includes a stiffening component 70 positioned on the radially outer surface thereof, and a protective element 72 positioned between the first axially-extending portion 66 and the stiffening component 70. This stiffening component 70 and/or protective element 72 may be made of relatively stiff materials, such as metals or the like, whereas the portions 64, 66, 68 may be made of a more compliant, resilient material, such as a fluoroelastomer, rubber, synthetic rubber, or the like. The stiffening component 70 and/or protective element 72 thereby protect the softer components 64, 66, 68 from wear and tear, extending the life of the sealing element 58. The stiffening component 70 can also serve to swage the sealing element 58 about the dynamic race 54 to aid in forming a seal between those components.

A seal insert/retaining component 74 is loosely mounted on the sleeve 36 and receives the static race 56 therein. The seal insert 74 may be fixed to the end casing 28 which is in turn fixed in the base opening 24 (or top opening 26) of the frame 18 by a frictional attachment or by other mechanical means. An O-ring or the like 76 is positioned between the seal insert 74 and the end casing 28 to aid in sealing the seal assembly 32. An O-ring 78 or the like is also positioned between the radially outer surface of the static race 56 and the radially inner surface of the seal insert 74 to maintain a seal between those components. Finally, an O-ring 80 or the like may be positioned in a groove 81 in the shaft 12, and be positioned between the shaft 12 and the sleeve 36, to further aid in sealing the end of the shaft 12.

Both the seal insert 74 and static race 56 are rotationally isolated from the shaft 12/sleeve 36 (that is, the seal insert 74 and static race 56 generally do not rotate with the shaft 12/sleeve 36). In contrast, since the shroud 46/sleeve 36 are rotationally coupled to the shaft 12, they carry the biasing element 52, sealing element 58 and dynamic race 54 with them such that those components are all rotatably coupled with the shaft 12.

The shroud 46 protects and shields the biasing element 52 to prevent fibrous materials from wrapping around the biasing element 52, which would otherwise interfere with proper operation of the seal assembly 32. Accordingly, the shroud 46 may extend axially at least the entire axial length of the biasing element 52, and may extend axially along part of the dynamic race 54, as shown in the illustrated embodiment. In addition, the shroud 46 may be positioned relatively close to the wall of the bore 30/end casing 38 such that the gap G between the radially outer surface of shroud 46 and the bore 30 wall/end casing 38 is quite small, equal to or less than at least about $6/1000$ of an inch in one case. The shroud 46, or at least its radially outer surface, may be made of a relatively smooth material and have a surface roughness less than at least about 100 Ra, or more particularly less than about 75 Ra. The shroud 46 can be made of a variety of materials, such as metal, including stainless steel, which may be finished or otherwise treated to provide the desired finish/smoothness. The shroud 46 should have a thickness sufficient to withstand the rigorous operating conditions to avoid wear and deformation. In some cases, such as in the case of a dual-shafted grinder, it has been found that the shroud should have a thickness (in the radial direction) of at least about $90/1000$ inch.

The positioning of the shroud 46 relative to the biasing element 52 and the relatively close clearance between the shroud 46 and the bore 30/end casing 28 prevents fibers and other materials from passing through the gap G, thereby protecting the biasing element 52. In particular, it has been found that fibrous materials, particularly those typically found in wastewater treatment and other similar applications, are typically prevented from passing through the gap G if the gap has a size of $6/1000$ of an inch or less. In addition, the smooth finish of the shroud 46, and the fact that the shroud 46 is positively driven by the sleeve 36/shaft 12, inhibits any fibrous or other materials from binding on the outer surface of the shroud 46, thereby ensuring that the gap G remains unclogged, allowing free rotation of the shroud 46. The shroud 46 can be used in combination with various seal assemblies, including seal assemblies with a more conventional dynamic race that do not form the secondary seal as described above.

In the illustrated embodiment, the biasing element 52 takes the form of a coil spring, but could include other biasing means, such as resilient bodies, volute springs, washer springs, leaf springs, gas springs, etc. One advantage of the coil spring, and certain other biasing elements, is that the coil spring has gaps between the coils which allow fluid to pass from a first or inner radial side to an outer or second radial side thereof to allow pressure equalization of the seal 32. A biasing element which does not allow pressure equalization thereacross can lead to pressure build up on one side or the other, which can compromise the seal 32 and/or lead to seal failure. In addition, the generally axially-extending portion 50 of the shroud 46 may be spaced away from, and not form a seal with, the radially inner components (such as the sealing element 58 and dynamic race 54) to further enable pressure equalization thereacross and not seal the spring 52 in a chamber.

In the illustrated embodiment, a bearing 82 is mounted about the sleeve 36 and positioned adjacent to the seal insert 74. The bearing 82 is designed to be slid on the sleeve 36 after the seal assembly 32 is mounted on the shaft 12. However, after being mounted on the shaft 12 or sleeve 36, the bearing 82 and the seal assembly 32 remain separate and are not directly attached to one another. Thus, the seal assembly 32 and bearing 82 are entirely separate structures that are never pre-assembled or joined together prior to insertion or mounting. The bearing 82 may include an inner race 84 which is positioned adjacent to and/or engaging the sleeve 36, and an outer race 86 which is positioned adjacent to and/or engaging the bore 30 wall/end casing 28.

A spacer 88 may be mounted on the sleeve 36 and engage the inner 84 and/or outer 86 race of the bearing 82. A bolt 90 may be threaded through the spacer 88 and into the end of the shaft 12 to retain the spacer 88, bearing 82 and seal assembly 32 in place on the end of the shaft 12. However, it should be understood that various other mechanisms may be utilized to retain the seal assembly 32/bearing 82 onto the sleeve 36/shaft 12, such as a snap ring received in a groove of the shaft 12, etc. The seal assemblies 32 at the top end of the shafts 12 (FIGS. 3 and 4) may be mounted in a similar manner with adjustments as appropriate. For example, the spacer 88 may have a different configuration, and a snap ring may be used in place of the bolt 90, etc.

A retainer ring 92 (FIG. 5) may be mounted on the sleeve 36, positioned axially between the bearing 82 and the seal insert 74. When the bearing 82 is fully mounted onto the sleeve 36, the bearing 82 engages the retainer ring 92 so that the retainer ring 92 maintains the bearing 82 in the proper axial position. During assembly or disassembly (i.e., when the bearing 82 is removed from the sleeve 36), the seal assembly 32, and more particularly the seal insert 74, shifts downwardly and engages the retainer ring 92 as biased by the spring 52. In this manner, the retainer ring 92 prevents the seal assembly 32 from being entirely pushed off of the sleeve 36. Thus, the retainer ring 92 serves the dual purpose of retaining the bearing 82 in place during operation, and retaining the seal assembly 32 in place (i.e., on the sleeve 36) during assembly/disassembly operations.

When the seal assembly 32 is utilized at the end of the shafts 12 of the grinder unit 40, a labyrinth seal 94 may be mounted on the end casing 28 adjacent to the seal assembly 32, and axially inwardly thereof, to aid in protecting and sealing the seal assemblies 32. In some cases, the bore 30 in the casing 28 may be a stepped bore having a smaller diameter portion 30a (FIG. 5) receiving the shroud 46, biasing element 52, sealing element 58 and dynamic race 54, and a larger diameter portion 30b receiving the static race 56 and seal insert 74. In this case, a spacer 96 may be positioned in the larger diameter portion 30b axially inwardly of the seal insert 74 to maintain proper positioning for the seal insert 74. In some cases the bore 30 may be a smooth, constant diameter bore in which case the spacer 96 may not be utilized, and in some cases the labyrinth seal 94 may not be utilized.

FIG. 6 illustrates the seal assembly 32 in an assembled condition. The seal assembly 32 can be mounted onto a shaft 12, either during production or in the field, to provide the advantages described herein.

Having described the invention in detail and by reference to the various embodiments, it should be understood that modifications and variations thereof are possible without departing from the scope of the invention.

What is claimed is:

1. A seal system comprising:
   a sleeve configured to receive a rotatable shaft therein;
   a dynamic race configured to be rotatably coupled to said shaft;
   a biasing element configured to urge said dynamic race into engagement with a static race to form a primary seal;
   a shroud configured to be rotatably coupled to said sleeve and positioned radially outside the biasing element; and
   a sealing element configured to be positioned radially inside said biasing element and to sealingly engage the sleeve to provide a secondary seal to generally block fluid bypassing said primary seal.

2. The system of claim 1 wherein said biasing element is urging said dynamic race and said static race into engagement with each other to form said primary seal, said shroud is positioned radially outside said biasing element and is rotatably coupled to said sleeve, and said sealing element is positioned radially inside said biasing element and sealingly engages said sleeve to provide said secondary seal.

3. The system of claim 2 further comprising said shaft received in said sleeve and said static race, and wherein said dynamic race is rotatably coupled to said shaft and said static race is not rotatably coupled to said shaft.

4. The system of claim 3 wherein said seal system is generally positioned inside a bore defined by a bore wall, and wherein said shroud is positioned relatively close to said bore wall to generally prevent materials from passing between said shroud and said bore wall.

5. The system of claim 4 wherein said shroud is positioned within at least about 6/1000 of an inch of said bore wall.

6. The system of claim 3 wherein said shaft carries a plurality of cutter elements thereon, and wherein the system further includes a supplemental shaft carrying a plurality of cutter elements thereon which interleave with said cutter elements of said shaft.

7. The system of claim 1 wherein a radially outer surface of said shroud is relatively smooth to prevent fibrous materials from binding to said outer surface.

8. The system of claim 7 wherein said radially outer surface has a surface roughness of less than about 75 Ra.

9. The system of claim 1 wherein said shroud is generally coaxial with said sleeve.

10. The system of claim 1 wherein said shroud extends axially at least an entire axial length of said biasing element.

11. The system of claim 1 wherein said sealing element includes a middle generally radially-extending portion and first and second generally axially-extending portions positioned on opposite sides of said middle portion, wherein said first portion forms said secondary seal with said sleeve, and said middle portion and said second portion are positioned adjacent to and engage said dynamic race.

12. The system of claim 1 wherein said sealing element includes a relatively hard stiffening component positioned on a radially outer surface thereof, and wherein the system further includes a protective element positioned radially between said biasing element and said sealing element.

13. The system of claim 1 wherein at least part of said sealing element is positioned axially between said biasing element and said dynamic race.

14. The system of claim 1 further comprising a retaining component positioned radially outside said static race and receiving said static race therein, and wherein said seal system is generally positioned inside a bore defined by a bore wall, and wherein a radially outer surface of said retaining component is rotationally coupled to said bore wall.

15. The system of claim 1 wherein said biasing element is configured to allow fluid to pass from a first radial side to a second radial side thereof to allow pressure equalization thereacross.

16. The system of claim 1 wherein said biasing element is a coil spring.

17. The system of claim 1 wherein said sealing element is positioned radially inside said biasing element such that a radial plane extends through both said sealing element and said biasing element.

18. The system of claim 1 further comprising said shaft received in said sleeve, and wherein said shaft carries a plurality of cutting elements thereon and is configured to grind, cut, shear or macerate solids suspended in a liquid stream.

* * * * *